Sept. 2, 1969

N. H. STARK 3,464,540

PROTECTIVE PACKAGING AND METHOD

Original Filed Feb. 7, 1957

INVENTOR.
Norman H. Stark
BY
*Fidler, Bradley & Patnaude*
Attys.

United States Patent Office 3,464,540
Patented Sept. 2, 1969

3,464,540
PROTECTIVE PACKAGING AND METHOD
Norman H. Stark, Mequon, Wis., assignor to Walker Manufacturing Company, Racine, Wis.
Original application Sept. 10, 1964, Ser. No. 395,591, which in turn is a continuation of application Ser. No. 638,703, Feb. 7, 1957. Divided and this application May 23, 1966, Ser. No. 551,909
Int. Cl. B65d 81/00
U.S. Cl. 206—46                                8 Claims

ABSTRACT OF THE DISCLOSURE

A protective package in which the article to be protected is embedded in a mass of open-cellular plastic foam containing particles of a surface-active sorbent substance dispersed throughout the open-cell structure of the foam and exposed to environmental conditions to which the foam is exposed. A particulate, surface-active sorbent substance is incorporated in to a liquid foamable plastic reaction mixture which is foamed-in-place in an outer container to form an open-cellular plastic envelope-cushion surrounding the article within the package.

---

This application is a division of application Ser. No. 395,591, filed Sept. 10, 1964, now abandoned, which application was filed by the present inventor as a continuation of his application Ser. No. 638,703, filed Feb. 7, 1957, now abandoned. The invention relates to protective packages and more particularly to a foamed-in-place package of cellular plastic foam containing a sorbent substance capable of reacting with deleterious environmental conditions to protect the article or articles embedded in the foam package and to a method of fabricating such packages.

A sorbent is a substance having an active surface area which sorbs, meaning to take up and hold either by adsorption or absorption. Exemplary of sorbent substances are those substances which are known as adsorbents, and capable of holding and retaining gases, liquids or dissolved substances. This property is commonly referred to as adsorption and is generally thought to be due to an adhesive attraction between the adsorbent and the adsorbate or the material to be adsorbed. A number of adsorbent compounds are known, a few of which, for example, are charcoal, clay, silica gel, and the like. These compounds are useful, for example, for such purposes as purifying agents, humidity-controlling agents, anti-corrosion agents and catalysts.

Another example of a sorbent can be found in that class of substances commonly referred to as absorbents, which are those substances able to take in gases or liquids and hold them by cohesion or capillary action.

Generally, most sorbent substances depend for their effectiveness upon the large active surface areas, both external areas and pore areas, which they present to the sorbate or to that material or substance to be sorbed. It is, therefore, a primary object of the present invention to produce an improved protective package utilizing a foamed composition having a large available active surface area.

Another object of the present invention is to provide an improved sorbent packaging material which is highly efficient, inexpensive, and easily manufactured, and in which the sorbent is highly dispersed.

The above and other objects and advantageous features of the invention will become apparent from the following description when read in the light of the accompanying drawing which is illustrative of the many applications of the present invention.

Figure 1:
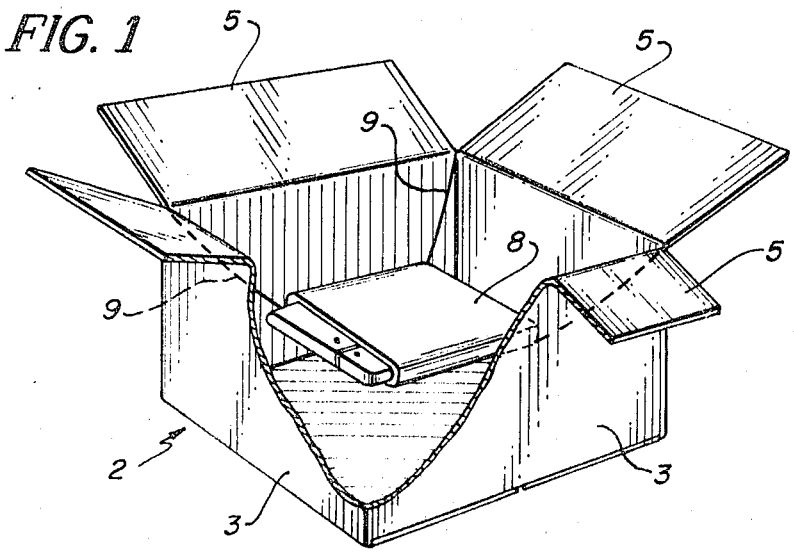
FIG. 1 is an isometric view, partially broken away of an embodiment showing a step in the packaging of an article to be embedded in cellular plastic foam.
Figure 2:
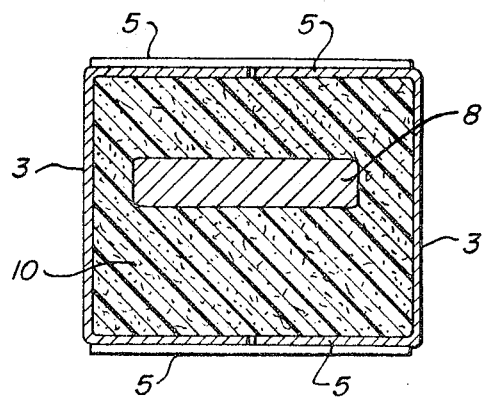
FIG. 2 is a vertical view of a completed protective package fabricated in accordance with the process of the present invention.
Figure 3:
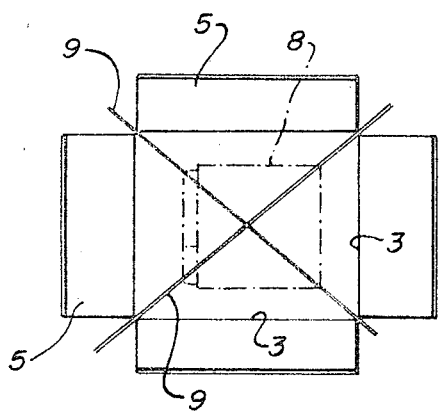
FIG. 3 is a top view of the package shown in FIG. 1, illustrating one means of positioning an article (shown in phantom lines) in the package prior to the addition of a liquid foam-forming reaction mixture.

FIGURES 1, 2 and 3 show a package comprising a cardboard container 2 having side walls 3 each of which are provided with a flap portion 5 adapted to be folded down when the container is closed. An article 8 is freely suspended in the open container 2 by means of supporting elements 9, such as string, wire or the like from the four corners of the container. The liquid foamable reaction mixture containing particles of a surface-active sorbent substance is introduced into the container and allowed to react to form an open-cell foam 10 which surrounds the article 8 suspended in the container which is closed after the reaction liquid is poured into it.

Broadly, the present invention provides an entirely new type of package using sorbent material consisting essentially of cellular plastic foam of open-cell structure having an active sorbent dispersed throughout its cellular structure. The novel sorbent material is produced by adding a particulate sorbent substance to a cellular plastic foam-forming mixture prior to or during the foaming action, and foaming the mixture containing the sorbent substance to incorporate and disperse the sorbent substance throughout the cellular structure of the open-cell foam product produced. Such sorbent materials have a multitude of commercial uses, and can be advantageously used wherever sorbent substances have heretofore been employed.

Solely for the purposes of illustration, desiccants have been selected as a particular class of sorbent substances. It is to be understood, however, that any sorbent substance can be employed to produce the novel sorbent materials of the instant invention. Silica gel is classified as an adsorbent and has the desirable properties of being able to pick up and retain water, such as in the form of water vapor in the air, for example. Accordingly, desiccants such as silica gel have found wide use as himidity-controlling agents and are particularly useful where it is desired that the humidity of an enclosure be maintained at a constant level. Silica gel has been found desirable for controlling the humidity within a packing case which contains a delicate instrument having highly polished surfaces which must be protected against corrosion or rust. It has been the practice to insert packages of granular silica gel, generally in the form of granules suspended in a bag of porous material, into the packing case. Moisture in the packing case is then adsorbed by the silica gel and the packing case is dehumidified to protect the particular device packed in it. A typical example of prior art solutions to the problem is found in U.S. Patent 2,080,066 which teaches a method of stabilizing the moisture content of a sealed package by the simple expedient of enclosing within the package a small perforated box containing a mineral gel such as silica gel, iron oxide gel or alumina gel.

Where the packed device is fragile and delicate, problems arise in preventing the object from being damaged during shipment and at the same time in effectively dehumidifying the packing and shipping container. As a packing for fragile and delicate objects, resilient plastic foams, of which polyurethane foam is an example, have been widely used. Such a plastic foam can either be cut into particular shapes and then placed around the objects to be packed, or, alternatively, the ingredients for producing the foam can be placed in the same shipping container with the objects to be packed and reacted to produce a foam packing substance directly in place and substantially around the object. In this latter method of packing, the packed object is completely supported and surrounded by a resilient and effectively shock-proof plastic foam substance. A suitable method for fabricating a "foamed-in-place" package is described in Simon et al. Patent 2,780,350, patented Feb. 5, 1957. In this method the article to be packaged is positioned in a container before the liquid foamable polyurethane reaction mixture is introduced. The liquid then foams around the article thereby embedding it in an open-cellular polyurethane envelope-cushion.

In accordance with the present invention, it has been found that by incorporating an active sorbent into the cells of a foamed plastic material the effective active surface area of the sorbent is substantially increased, access to the pore area of the sorbent is enhanced, and accordingly, substantially less sorbent is required to produce a desired result.

As one illustrative example of the present invention, it has been discovered that when granular silica gel activated according to well known procedures is incorporated into polyurethane foam, the resulting product is highly efficacious for applications in which it is desired to control the humidity in a closed volume. Additionally, it has been discovered that by incorporating such silica gel or other active sorbent substances into a foamed plastic material, the properties of the sorbent are substantially improved because of the increased available surface and pore area of the sorbent. Thus, it has been found that a plastic foam having an open cellular structure and having a desiccant or other sorbent substance incorporated in its cells is more efficient for a given use than the same weight of the sorbent substance alone.

A polyurethane polymer is formed by the reaction of a diisocyanate with a polyhydroxy material. Generally these resins are classed as e.g., polyether or polyester polyurethanes, depending on the chemical nature of their polymeric units. There are other, less commonly used, types classified as to the nature of the polymer with which the isocyanate is reacted. A polyurethane foam is produced by generating carbon dioxide, e.g., by reaction of water with an isocyanate, or other gas in the reaction mixture, e.g., by vaporization of a volatile liquid by the heat of reaction, while converting a liquid form of the polymer to a solid form of the polymer, e.g., by cross-linking or otherwise increasing the molecular weight of the liquid polymer.

Expanded plastic materials, of which polyurethane foams are an excellent example, have been found to be particularly useful in the present invention and are desirably of the type which afford a lattice-work or cellular structure having a multiplicity of interconnected cells or voids, or in other words, of the type having an open cell structure. Polyurethane foam of this type is well known and is generally referred to as open-celled because a portion of the faces of the cells have been ruptured during foaming so that the mass of cells are interconnected. Also, such a foam is desirably soft, resilient and flexible. Although the present invention will be described in terms of open-cell polyurethane foam, it should be understood that other cellular plastic foams or like materials having similar properties would serve as well.

The production of foamed open-cell structures of isocyanate-derived polymers of various types is well understood in the polymer art, and is described, for example, in "German Plastics Practice," published by Debell and Richardson, 1946, Chapter 21, "Plastic Foams," pages 462–465; in "Papers Presented at the Atlantic City Meeting: Synthesis of Isocyanate Polymers," published by the American Chemical Society, Division of Paints, Plastics and Printing Ink Chemistry, September 1956; and in the patent literature.

Polyurethane foams are produced, for example, by a reaction between a plasticized polyester resin and a polyisocyanate. As an illustrative example, one polyurethane resin which has been found to be particularly useful is formed by reacting, in the presence of a suitable catalyst, a polyester resin, produced substantially from adipic acid and diethylene glycol, with toluene diisocyanate. The proportions of the ingredients are carefully determined in the conventional manner so that the final product will have a multiplicity of interconnecting voids or cells. The reaction is performed in a vessel of sufficient size or oven, for example, in the packing case in which a fragile device is to be packed. When the foaming reaction is complete, the plastic foam is removed from the vessel, if formed separate from a packing case, and cut into desired shapes and sizes, or even shredded into small particles. If, however, the plastic foam is produced directly around an article to be packed in a box or the like, it is only necessary to trim off the excess plastic foam from the top of the box before it is sealed. The foam thus produced is a resilient, flexible, highly porous material having sponge-like characteristics and having a multiplicity of interconnecting voids or cells and thus a large internal surface area. Because the foam is easily compressible, pieces of the foam can be inserted around an article to be packed. Also, the article is thus packed in a relatively jar-proof container and is adequately supported against damage during shipment.

To produce a sorbent material which is a polyurethane foam having a desiccant dispersed therein, the resin is prepared substantially as described above. Before this material is reacted with an isocyanate, active granular silica gel is added and mixed in thoroughly. The required amount of toluene diisocyanate and suitable catalysts are added to the resin and silica gel mixture and the foam is allowed to form in a suitable container. It is an inherent feature of the process that during the foaming action the solid particles of sorbent substance dispersed throughout the liquid reaction mixture are carried on the walls of the liquid cells being formed in the polymer and are bonded thereto as the liquid is converted by the reaction to a solid expanded form. In the final product, with its multiplicity of interconnecting cells the sorbent particles thus incorporated into the cells are suspended in a three dimensional network where a large portion of their surface area is exposed to surrounding atmosphere and air currents passing through the structure. It should be understood, of course, that other active sorbent substances can be added and the invention should not be limited to the use of silica gel.

As an example of a typical foam mixture, one can mix 94.5 parts of the above described polyester resin mix with 25 parts of granular silica gel, and then add 40 parts of toluene diisocyanate and allow the plastic foam to form. While the foregoing mixture produces a plastic foam having improved adsorption properties which are satisfactory for many purposes such as controlling the humidity in a packing case, or, alternatively, for controlling the humidity in a gaseous system such as in an air-conditioning system, it should be understood that the amount of silica gel can be increased or decreased as desired. Upon increasing the amount of sorbent the density of the foam product will increase. For most applications, however, dense products containing a high percentage of sorbent can be produced apparently without impairing the open cell structure of the foam and without increasing the resistance of the foamed substance to the passage of gases or reducing its effectiveness as an adsorption composition.

To illustrate the effectiveness of the impregnation of a polyurethane foam with silica gel formed as described above for humidity conditioning purposes, a foam sample having 15.5% silica gel incorporated therein was placed in a humidity cabinet at 98% relative humidity. In this particular test, 13 grams of silica gel were used. Before placing this foam in the cabinet, its dry weight was measured and after approximately four hours at 98% relative humidity, the foam and dispersed silica gel was found to have gained approximately 7.5 grams in weight.

A similar humidity cabinet test was run with a bag of powdered silica gel of the same weight as that amount of silica gel incorporated in the foam. After four hours at 98% relative humidity, the bag of silica gel was found to have gained 3 grams over and above its dry weight. A similar weight of plain untreated polyurethane foam, which did not include dispersed silica gel, was found after four hours at 98% relative humidity to have gained 3½ grams. It can thus be seen that by incorporating granular silica gel into the cellular structure of a plastic polyurethane foam, a synergistic effect is achieved in that the moisture retaining characteristics of the combined foam and silica gel are greater than the sum of the moisture-retaining characteristics of the foam and silica gel separately. This is clearly illustrated by the foregoing tests in which a body of foam comprising 13 grams of silica gel dispersed in a given weight of polyurethane foam gained 7.5 grams of moisture, whereas separate portions consisting of 13 grams of silica gel and the same weight of plastic foam gained 3 grams and 3.5 grams, respectively, for a total of 6.5 grams, or one gram less than the combined silica gel and foam.

Although other uses and applications of the present invention may become apparent from the foregoing description, it should be understood that there is no intention to limit the invention to the specific polyurethane foam and silica gel examples given above. On the contrary, the intention is to cover all modifications, alternatives, equivalents, and uses falling within the spirit and scope of this invention.

What is claimed is:

1. In a method for fabricating a foamed-in-place package which comprises positioning the article to be packaged in a container, introducing a liquid foamable plastic reaction mixture into said container, and foaming said mixture around the article thereby embedding the article in an open-cellular plastic envelope-cushion, the improvement comprising, incorporating a particulate, surface-active sorbent substance with the liquid foamable plastic reaction mixture prior to the foaming action to thereby form a foamed-in-place package in which the foam surrounding the article contains particles of said sorbent substance bonded to the open-cellular structure and exposed to environmental conditions to which the cellular plastic foam is exposed.

2. The method in accordance with claim 1 wherein the sorbent substance is admixed with one of the reactants of the foam-forming mixture.

3. The method in accordance with claim 1 wherein the cellular plastic foam is an open-cell polyurethane foam.

4. The method in accordance with claim 3 wherein the cellular plastic foam is a polyether polyurethane foam.

5. The method in accordance with claim 3 wherein the cellular plastic foam is a polyester polyurethane foam.

6. A method for packing a device in a container and for controlling the humidity in said container comprising mixing a polyester resin and an active moisture adsorbent substance in said container, placing the device to be packed in said container, reacting with said resin an isocyanate to produce an open-cell foam having a plurality of intercommunicating cells with particles of said adsorbent substance bonded thereto, whereby said foam substantially completely surrounds the device.

7. A method for packing a device in a container and for controlling the humidity in said container comprising mixing a polyester resin and a surface-active silica gel in said container, placing the device to be packed in said container, reacting with said resin an isocyanate to produce an open-cell foam having a plurality of intercommunicating cells with particles of said silica gel bonded thereto, whereby said foam substantially completely surrounds the device.

8. A protective package comprising
an outer container,
a mass of foamed-in-place cellular plastic foam of open-cell structure substantially filling said container,
an article to be protected embedded in the foamed mass which completely surrounds said article, and
particles of a surface-active sorbent substance dispersed throughout the open-cell structure of the foam and bonded thereto and exposed to environmental conditions to which the cellular plastic foam is exposed.

References Cited

UNITED STATES PATENTS

| Re. 24,767 | 1/1960 | Simon et al. | 206—46 |
| 2,888,407 | 5/1959 | Cooper et al. | |
| 2,914,377 | 11/1959 | Bull | 206—46 |
| 2,516,124 | 7/1950 | Kishibay | 206—46 |
| 2,895,603 | 7/1959 | Freeman | 206—46 |
| 3,204,385 | 9/1965 | De Remer et al. | 206—46 |

WILLIAM T. DIXSON, Jr., Primary Examiner

U.S. Cl. X.R.

264—41; 312—31